April 5, 1966  J. DECKER ET AL  3,244,574
SPIN WELDING APPARATUS FOR JOINING PLASTIC WORKPIECES
Filed May 5, 1961  2 Sheets-Sheet 1
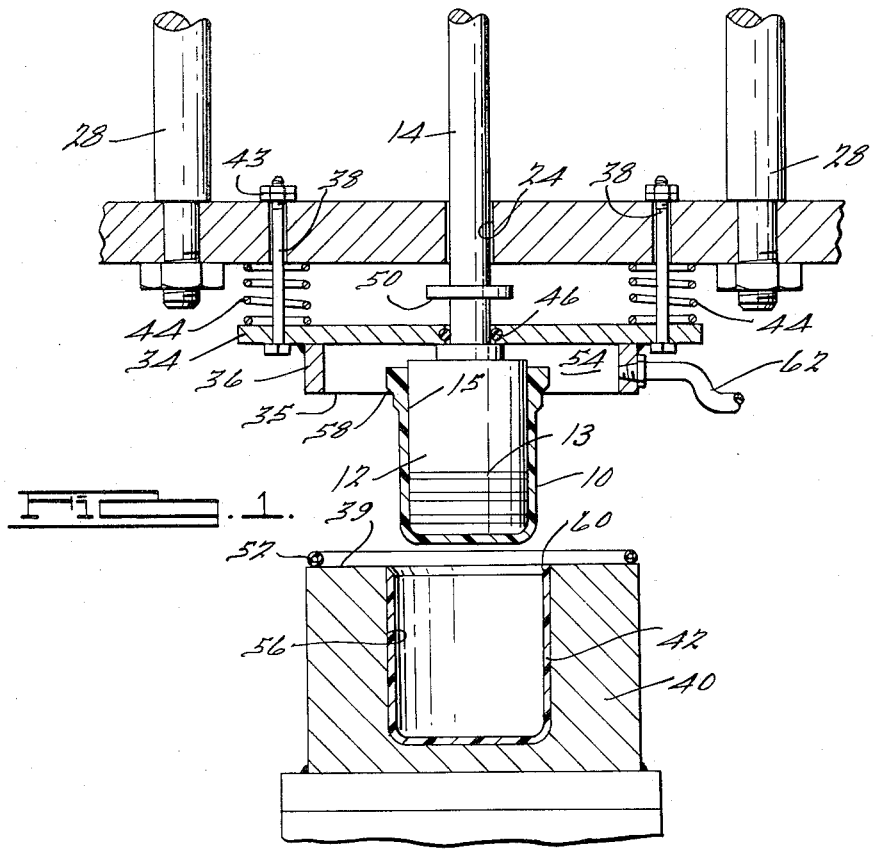
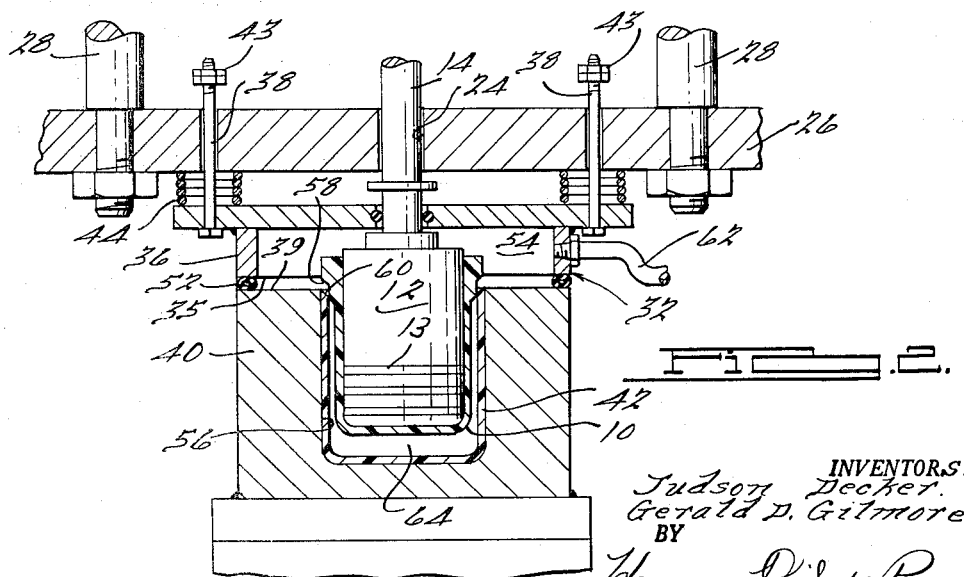
INVENTORS.
Judson Decker.
Gerald D. Gilmore.
BY
Harness, Dickey & Pierce.
ATTORNEYS April 5, 1966  J. DECKER ET AL  3,244,574
SPIN WELDING APPARATUS FOR JOINING PLASTIC WORKPIECES
Filed May 5, 1961  2 Sheets-Sheet 2

INVENTORS.
Judson Decker
Gerald D. Gilmore
BY
Harness, Dickey & Pierce
ATTORNEYS

United States Patent Office 3,244,574
Patented Apr. 5, 1966

3,244,574
SPIN WELDING APPARATUS FOR JOINING PLASTIC WORKPIECES
Judson Decker, Birmingham, Mich., and Gerald D. Gilmore, Rochester, Minn., assignors to Bopp-Decker Plastics, Inc., Birmingham, Mich., a corporation of Michigan
Filed May 5, 1961, Ser. No. 108,140
6 Claims. (Cl. 156—382)

This invention relates to improvements in spin welders of the type which rotate plastic workpieces relative to each other to cause friction therebetween to fuse the same together at their contacting surfaces. The invention more particularly concerns the provision of novel means for producing a partially evacuated cavity between the workpieces so that subsequent heating thereof within reasonable limits after the cavity has been formed and sealed will not cause excessive pressures therein which would tend to bulge or buckle the workpieces.

In the production of thermo-containers which generally comprise separated wall portions defining an airtight cavity, the problem constantly arises, as mentioned above, of how to provide a partial vacuum in this cavity in order to prevent the aforesaid buckling and/or bulging of the container walls. Several different means have been utilized to cause this partial vacuum, including heating the separate workpieces of the containers before joining them so that after joining and after the container has cooled down, a partial vacuum will exist in the cavity. Moreover, drilling a hole in a wall of the container and drawing part of the air from the cavity and thereafter sealing the hole has been attempted. As might be expected, these methods have been time-consuming, costly, and relatively ineffective for positively providing the partial vacuum required.

It is a principal object therefore of this invention, to provide means for rapidly and effectively producing a partially evacuated cavity formed by and between the separate sections of a thermo-container.

A further and specific object is to provide an apparatus having separate workpiece supporting means for holding separate ones of the workpieces, with a closure member adapted to form an airtight chamber containing the supporting members and their workpieces prior to the joining of the workpieces together, and with a source of vacuum for evacuating said chamber and any cavities formed by the workpieces prior to their joining.

Further objects and advantages of the present invention will become apparent from the following description and drawings in which:

FIGURE 1 represents a cross sectional view of the apparatus of the present invention shown in its initial stage of operation;

FIGURE 2 shows the apparatus of FIGURE 1 in its workpiece cavity evacuating stage;

Figure 3:
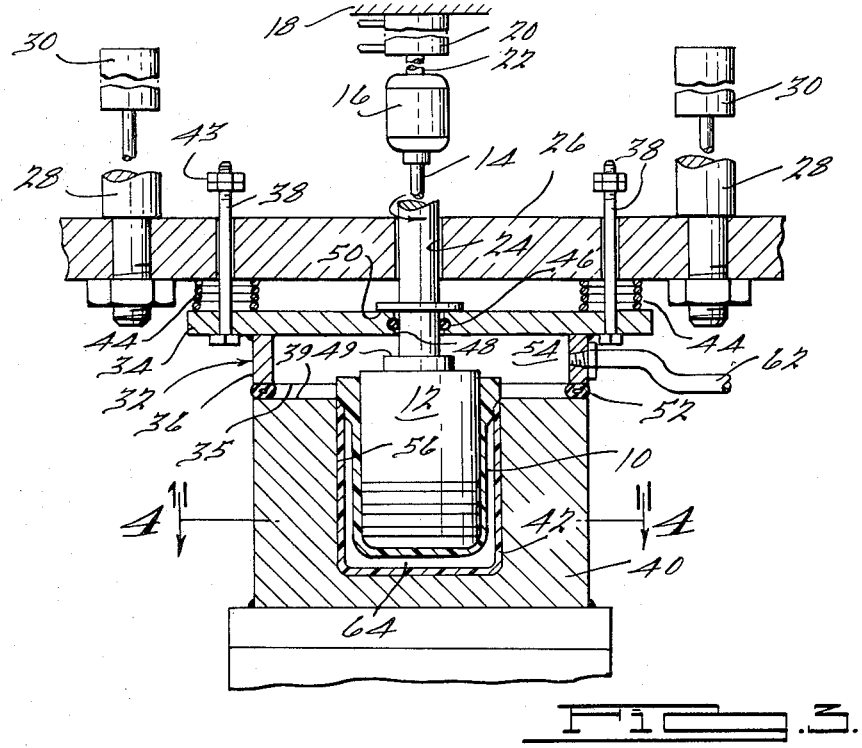
FIGURE 3 shows the apparatus in its workpiece joining stage.
Figure 4:
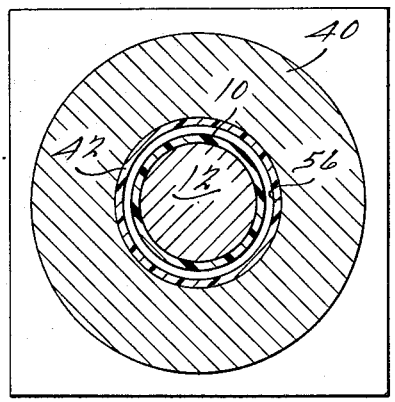
FIGURE 4 is a cross sectional view of FIGURE 3 taken along the line 4—4 thereof in the direction of the arrows.

Referring to FIGURE 1 a thermo-container section 10 is shown frictionally frictionally held on a movable support or mandrel 12 which may be provided with compressed resilient rings 13 frictionally engaging the inner wall 15 of section 10. This mandrel is provided with a driveshaft 14 adapted for connection to an electric motor 16 which may be vertically reciprcably mounted by any suitable means such as hydraulic cylinder 20 connected to base 18 and having a piston 22 connected to the motor 16. Shaft 14 is rotatably and slidably mounted in aperture 24 in a closure member carrier plate 26 which is connected to piston shafts 28 forming part of hydroulic cylinders 30, which, like cylinder 20 has a sufficiently long stroke to clear the container section 42 from the top 39 of a fixed support 40 described in detail below.

A closure member 32 comprises a plate 34 welded or otherwise secured to a tubular portion 36 and carries bolts 38 which slidably project through carrier plate 26 to control the motion of closure member 32 toward and away from the stationary base member 40 which contains the other section 42 of the container. Nuts 43 limit the movement of member 32 as it urged toward base 40 by springs 44 intermediate plates 26 and 34. An O-ring seal 46 is provided in an aperture 48 in plate 34 to slidably and sealingly receive the driveshaft 14. A pair of shoulders 49 and 50 on shaft 14 limit the relative movement between shaft 14 and closure member 32. Either the top edge 39 of base 40 or the lower end 35 of tubular portion 36 may be provided with an O-ring type seal 52 to complete an airtight chamber 54 communicating with the base member 40, the closure member 32, the mandrel 12 and the container sections 10 and 42.

In the operation of the device, section 42 of the container is inserted in cavity 56 in the base support 40 in such a manner as to sufficiently frictionally engage the walls of this cavity to prevent relative rotation between itself and the base 40. It is noted that if the container is to have a handle, the handle may conveniently be inserted into a slot in the base 40 to thereby provide a key for preventing the aforesaid relative rotation. The carrier plate 26, closure member 32 and mandrel 12 with the container section 10 frictionally fixed thereon are then brought downwardly as shown in FIGURE 2 so that the closure member forms the airtight chamber 54 with the base 40.

At this point in the operation with chamber 54 formed, it is noted that the mandrel 12 has not been brought down far enough to cause the joining surfaces 58 and 60 of sections 10 and 42 respectively of the container to engage. At this point or even before, a source of vacuum such as a reciprocating or centrifugal type vacuum pump is operatively connected through suitable valve means to a conduit 62 secured in the wall 36 of closure member 32 to partially evacuate the chamber 54. During the evacuation of chamber 54, it is obvious that evacuation of the cavity 64 formed by and between the container members 10 and 42 will occur.

The stage of the operation of the device as shown in FIGURE 3 brings the surfaces 58 and 60 of the container sections into frictional engagement with each other while the mandrel 12 is rotating section 10 at a fairly high speed. Alternately, the rotation of the mandrel 12 may take place after initial contact of surfaces 58 and 60 is made. In this respect, it is noted that the hydraulic cylinders 20 and 30 are separately actuated so that the mandrel 12 will lag somewhat behind closure member 32 to give the vacuum source time to partially evacuate chamber 54. After the fusion joint between the container sections has been made, the completed container can readily be pulled by mandrel 12 from the base 40 since the expansible rings 13 grip section 10 harder than base 40 grips section 42.

It is particularly noted that the specfic shapes of the container section supports 12 and 40 may obviously be widely varied to accommodate a great variety of shapes of container sections, and should it be necessary, these supports may comprise split segments to accommodate workpieces or container sections which could not be readily removed from one piece supports.

What is claimed is:
1. Apparatus for use in the manufacture of evacuated hollow articles having complemental body portions formed with annular mating surfaces comprising
  a pair of aligned supports adapted to receive and to hold respective body portions and normally spaced to hold said body portions apart,
  means for slidably actuating at least one of said supports to join said body portions at the mating surfaces thereof,
  complemental, separable closure means on said supports and in surrounding relation to said body portions,
    said closure means having sealing means associated therewith and being relatively movable with said supports and adapted to meet and engage said sealing means before the mating surfaces of said body portions to define a closed vacuum chamber containing said body portions and including the space between said body portions,
  means connected to said closure means for evacuating said chamber and said space before the mating surfaces of said body portions are joined whereby the hollow interior of the article which is formed when the mating surfaces are joined also is evacuated, and
  means for rotatably driving at least one of said supports when said body portions are joined to spin weld the latter at said mating surfaces.

2. Spin welding apparatus for vacuum ware plastic articles having complemental body portions formed with annular mating surfaces,
  a pair of aligned supports adapted to receive and to hold respective body portions normally spaced to hold said body portions apart and movable to join said body portions at the mating surfaces thereof,
  complemental separable closure means, on and movable with said supports and in surrounding relation to said body portions,
  annular sealing means on at least one of said closure means and adapted for sealing engagement with the other of said closure means before the mating surfaces of said body portions are joined whereby said closure means and said sealing means define a closed vacuum chamber containing said body portions and including the space between said body portions,
  means connected to said closure means for evacuating said chamber and said space before the mating surfaces of said body portions are joined whereby the hollow interior of the article which is formed when the mating surfaces are joined also is evacuated, and
  means for rotatably driving at least one of said supports when said body portions are joined to spin weld the latter at said mating surfaces.

3. Apparatus for use in the manufacture of evacuated hollow articles having complemental body portions formed with annular mating surfaces comprising
  a pair of aligned supports adapted to receive and to hold respective body portions and normally spaced to hold said body portions apart,
  means for slidably actuating at least one of said supports to join said body portions at the mating surfaces thereof,
  complemental separable closure means on and sealingly engaging said supports and in surrounding relation to said body portions,
    said closure means having sealing means associated therewith and being slidably movable with said supports and adapted to engage said sealing means before the mating surfaces of said body portions to define a closed vacuum chamber containing said body portions and including the space between said body portions,
  lost motion means interposed between at least one of said closure means and said supports and operable to permit relative movement between said supports to join the mating surfaces of said body portions after said closure means engage to define said vacuum chamber,
  means for evacuating said vacuum chamber before the mating surfaces of said body portions are joined whereby the hollow interior of the article which is formed when the mating surfaces are joined also is evacuated, and
  means for rotatably driving at least one of said supports when said body portions are joined to spin weld the latter at said mating surfaces.

4. Spin welding apparatus for vacuum ware plastic articles having complemental body portions formed with annular mating surfaces comprising
  a first support adapted to receive and to hold one of said body portions,
  a second support adapted to receive and to hold the other of said body portions normally positioned to hold said body portions apart and slidably movable to join said body portions at said mating surfaces,
  a mounting plate on said second support and yieldably movable relative thereto in the direction of said sliding movement,
  annular closure means on said mounting plate and around said second support engageable by said sliding movement with said first support before the mating surfaces of said body portions are joined,
  means for sealing said closure means against said first support to provide a closed vacuum chamber containing said body portions and including the space between said body portions,
  means for evacuating said chamber and the space between said body portions before the mating surfaces of the latter are joined, and means for rotatably driving at least one of said supports when said body portions are joined to spin weld the latter at said mating surfaces.

5. Apparatus for use in the manufacture of hollow articles having complemental body portions formed with annular mating surfaces comprising
  a stationary support having a cavity for receiving and holding one of said body portions and a radial end face at the mouth of said cavity,
  a reciprocable and rotatable support adapted to receive and to hold the other of said body portions,
    said movable support normally holding the body portion carried thereby spaced from the other of said body portions and adapted by reciprocatory movement thereof to join said body portions at said mating surfaces,
  means including a mounting plate reciprocable with and sealed to and rotatably receiving said movable support,
  a closure ring on said mounting plate around said movable support cooperable with the end face of said stationary support to define a closed chamber containing said body portions,
  means for sealing said ring and said end face to assure a fluid-tight chamber, and
  means for evacuating said chamber, rotation of said movable support being operable to spin weld said body portions at said mating surfaces.

6. Spin welding apparatus for vacuum ware plastic articles having complemental body portions formed with annular mating surfaces comprising
  a stationary support adapted to receive and to hold one of said body portions,
  a rotatable and reciprocable support adapted to receive and to hold the other of said body portions,
  a carrier plate associated with said movable support,
  means for reciprocating said carrier plate and said movable support in unison,
  a mounting plate on said carrier plate and yieldable relative thereto in the direction of said reciprocatory movement and rotatably and sealingly engaging said movable support, a closure ring on said mounting plate cooperable with said stationary support to provide a chamber containing said body portions, means for sealing said chamber, means for evacuating said chamber, and means for rotatably driving said movable support, whereby slidable actuation of said movable support in one direction is operable to join said body portions at said mating surfaces and sliding movement of said carrier plate in unison with said support is operable to engage said ring with said stationary support to form said chamber prior to engagement of said mating surfaces, and whereby evacuation of said chamber also evacuates the space between said body portions and whereby rotation of said movable support after said mating surfaces are joined spin welds said body portions to form said evacuated hollow article.

References Cited by the Examiner

UNITED STATES PATENTS

| | | | |
|---|---|---|---|
| 2,532,839 | 12/1950 | Fawick | 156—285 |
| 2,684,777 | 7/1954 | Danzin et al. | 156—286 |
| 2,956,611 | 10/1960 | Jendrisak | 156—73 |
| 3,055,058 | 9/1962 | Van Hartesveldt | 156—286 |
| 3,062,695 | 11/1962 | Hull | 156—73 |
| 3,120,570 | 2/1964 | Kennedy et al. | 156—73 |

EARL M. BERGERT, *Primary Examiner.*

R. J. CARLSON, P. DIER, *Assitant Examiners.*